United States Patent [19]
Oka

[11] Patent Number: 5,446,250
[45] Date of Patent: Aug. 29, 1995

[54] FIBERGLASS REINFORCED PLASTIC DAMPING MATERIAL

[75] Inventor: Ryusuke Oka, Iwata, Japan

[73] Assignee: Yamaha Hatsudoki Kabushiki Kaisha, Iwata, Japan

[21] Appl. No.: 194,699

[22] Filed: Feb. 10, 1994

[51] Int. Cl.$^6$ ............................................. F16F 15/00
[52] U.S. Cl. ................................... 181/208; 428/138
[58] Field of Search .............. 181/207, 208, 209, 290, 181/292, 294, 295; 428/428.1,

[56] References Cited

U.S. PATENT DOCUMENTS

| | | | |
|---|---|---|---|
| 2,184,482 | 12/1939 | Austin et al. | 181/208 |
| 3,160,549 | 12/1964 | Caldwell et al. | 181/208 |
| 3,640,830 | 2/1972 | Oberst et al. | 181/208 |
| 5,337,288 | 8/1994 | Sorathia et al. | 181/207 X |

Primary Examiner—Khanh Dang
Attorney, Agent, or Firm—Knobbe, Martens, Olson & Bear

[57] ABSTRACT

A method of forming a damping plate from a fiberglass reinforced plastic base plate and a layer of cushioning material by utilizing a restrainer plate on the other side of the layer of cushioning material from the base plate and which is thinner than the base plate and no thicker than the layer of cushioning material. The cushioning material is formed with a plurality of openings so as to afford flow of liquid adhesive into the openings to assure uniform distribution and good bonding during assembly. The plate may be employed as a portion of a hull of a watercraft for sound deadening.

18 Claims, 6 Drawing Sheets

1

FIBERGLASS REINFORCED PLASTIC DAMPING MATERIAL

BACKGROUND OF THE INVENTION

This invention relates to a fiberglass reinforced plastic damping material and a manufacturing process therefor, and more particularly to an improved damping panel and method of manufacturing it which incorporates as one of the materials a fiberglass reinforced plastic.

There are many instances where it is desirable to provide a panel in a construction that has damping characteristics so as to reduce noise and vibration transmission through the panel. For example, these panels are frequently employed in watercraft hull configurations for dampening the sounds and vibration of the engine and/or propeller or other propulsion device from the occupants of the watercraft.

Normally, the way such damping plates are formed is to lay up or otherwise form a fiberglass reinforced plastic base plate and to affix to that base plate a damping plate having a cushioning property such as rubber or a plastic having rubber-like characteristics. Frequently, it is also desirable if not necessary to provide another retention panel on the side of the damping panel opposite to that attached to the base plate for appearance, structural and other reasons. Such sandwich-type constructions, however, have certain disadvantages.

That is, with the previously proposed structures, the cushioning layer must have a thickness equal to or greater than both the base plate and the facing plate. As a result, weight and volume increase which is not at all desirable.

It is, therefore, a principal object of this invention to provide an improved damping plate material having a light weight, the necessary structural properties and also good damping properties.

It is a further object of this invention to provide an improved fiberglass reinforced plastic panel having cushioning properties and still of light weight and good damping characteristics.

The construction of damping panels of the type described normally consists of forming the base plate and then bonding the cushioning plate to the base plate by means of an adhesive or the like. However, these panels have relatively large surface areas and it is difficult to ensure that the adhesive forms a complete bond between the base plate and the damping plate. Where a further plate is positioned on the opposite side of the damping plate from the base plate, then the problems of bonding becomes significantly increased.

If the surfaces are not completely secured to each other throughout their entire surface, then there will be weak parts occur which can cause separation of the damping plate and not only a decrease in strength, but also a decrease in the damping performance.

It is, therefore, a still further object of this invention to provide an improved method of manufacturing a damping panel.

It is a further object of this invention to provide an improved manufacturing process for damping panels that will ensure complete adhesion of the damping material to the base plate while simplifying the manufacturing process.

SUMMARY OF THE INVENTION

A first feature of this invention is adapted to be embodied in a damping panel that is comprised of a base plate made of a fiberglass reinforced plastic, a layer of cushioning material affixed to one side of the base plate and a restraint plate fixed to the layer of cushioning material on the other side from the base plate and which restraint plate is also formed of fiberglass reinforced plastic. In accordance with this feature of the invention, the restraint plate is of lesser thickness than the base plate so as to permit flexure and increase the damping by generating heat upon flexure.

A further feature of the invention is adapted to be embodied in a cushioning panel that is comprised of a base plate and a layer of cushioning material which are affixed to each other by an interposed adhesive. One of the joined layers is formed with a plurality of spaced apart holes into which the adhesive may flow when the members are bonded to each other.

A still further feature of the invention is adapted to be embodied in a method for forming a cushioning plate comprised of a base plate and a layer of cushioning material. One of these layers is formed with a plurality of spaced openings. An adhesive material is positioned between the two layers and pressure is applied to them to displace the adhesive at least in part into the formed holes.

DETAILED DESCRIPTION OF THE PREFERRED EMBODIMENTS OF THE INVENTION

Figure 1:
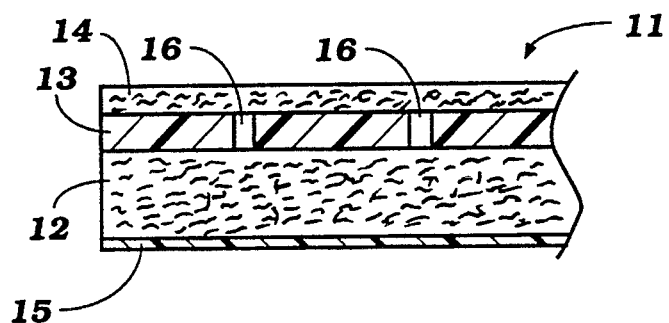
FIG. 1 is a cross-sectional view taken through a damping panel constructed in accordance with an embodiment of the invention.
Figure 2:
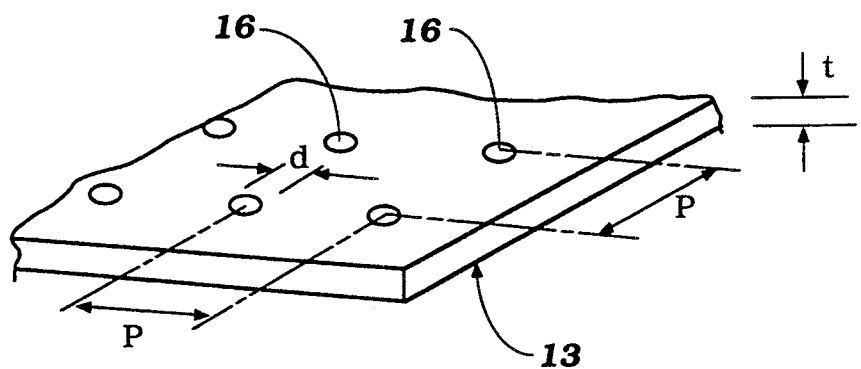
FIG. 2 is a perspective view showing the layer of cushioning material.
Figure 3:
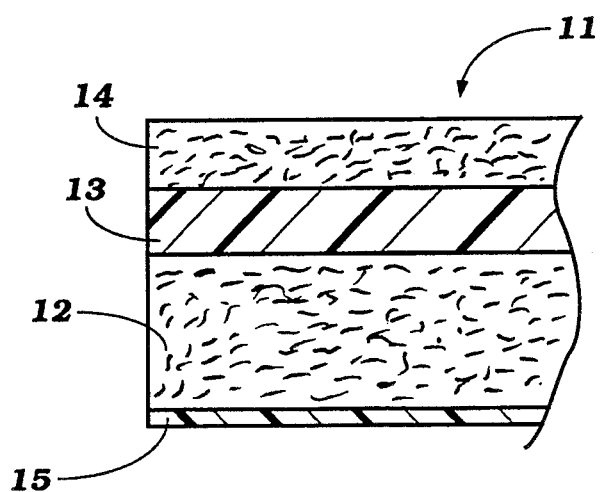
FIG. 3 is a view, in part similar to FIG. 1, but on an enlarged scale.
Figure 4:
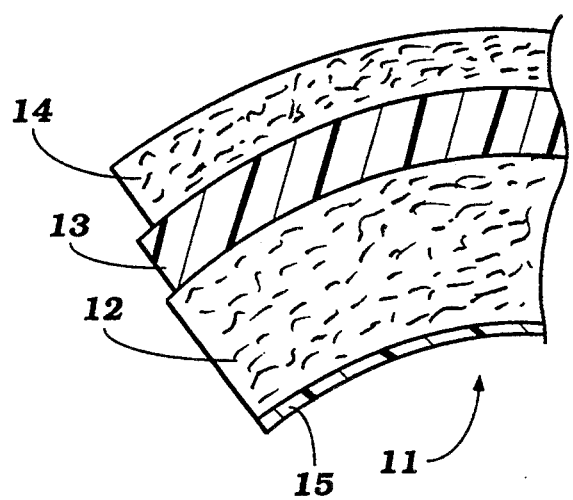
FIG. 4 is a view, in part similar to FIG. 3, and shows the configuration of the panel when it is deflected.

Referring now in detail to the drawings and initially to FIGS. 1–4, a damping panel constructed and manufactured in accordance with an embodiment of the invention is identified generally by the reference numeral 11. The panel 11 is comprised of a base plate layer 12 formed from a fiberglass reinforced plastic of any known type and which may be formed either from a laid-up or sprayed method.

A layer 13 of a suitable cushioning material having rubber or being formed from a plastic having rubber-like sound dampening characteristics is affixed by adhesive bonding to the base layer 12. A suitable material for the damping layer 13 may be a copolymer of vinyl chloride and vinyl acetate which is extremely effective at normal temperatures such as 20° C. When such a copolymer is used, it is preferable to apply a urethane-based primer as an adhesive on the surface of the damping layer 13 before it is adhered to the base layer of plate 12.

A further restraining layer 14 of a more rigid material, preferably a further fiberglass reinforced plastic layer is affixed by an adhesive bonding or the like to the side of the cushioning layer 13 opposite that of the base plate 12. In the preferred constructions, the restraining layer or plate 14 has a thickness that is substantially less than the thickness of the base plate 12 and which is no greater than that of the cushioning layer 13. In a specific embodiment of the invention, the base layer 12 may have a thickness of 10 mm while the damping layer 13 and restraining layer 14 have thickness of 2 mm each.

For appearance purposes, a gel coat layer 15 may be laminated to the outer surface of the base plate 12. When used in a hull construction, the gel coat 15 will face outwardly while the restraining plate 14 will face inwardly. If desired, a gel coat layer may also be laminated to the outer surface of the restraining plate 14.

Because of the fact that the restraining plate 14 is relatively thin compared to the base plate 12, the structure has sufficient flexibility so that it can easily bend under loads as shown in FIG. 15. When this is done, a shearing action will occur at the interface between the layers 12, 13 and 14 so as to generate heat and assist in the damping.

It has already been noted that the layers 12, 13 and 14 are secured to each other by an adhesive bond. When this is done, it is desirable, if not imperative, to form a full bond over the entire surfaces. This requires complete dispersion of the adhesive material along the surfaces of the parts to be bonded. This is difficult when large surface areas are employed, such as surface areas that are 1 meter or more in dimension. In order to ensure complete dispersion of the adhesive, the cushioning layer 13 is provided with a number of small through-holes 16 so that the adhesive can be easily dispersed by applying pressure to the surfaces to be joined. The adhesive may then flow into the hole 16 so as to ensure a uniform spread without pockets being formed. In a specific embodiment, the pitch P between the holes 16 may be approximately 50 mm while the diameter d of the holes may be about 5 mm or less. Of course, other techniques may be employed.

A specific manufacturing process which may be employed for forming the damping panel 11 may comprise the formation first of the gel coat layer 15 over which the base plate layer 12 is laminated either by a hand laying up method or by a spraying method. With the laying up method, a sheet of fiberglass weaving is set in a mold and a suitable resin such as unsaturated polyester is applied to impregnate this base and then short fibers are sprayed, and a further impregnation with a resin follows. This process may be repeated several times to form the desired thickness. During this lamination, air bubbles are dispelled between each layer in any known manner.

Before the setting up of the base plate 12 is completed, the cushioning layer 13 is disposed over it with an adhesive, if desired, and a rolling action follows so as to ensure complete dispersion of the resin across the surface of the cushioning plate 13 with the excess liquid material being forced into the openings 16. Although a hand laying up method has been described, a spray up method also can be employed for forming the base plate 12.

The restraining plate 14 is then formed either by the hand laying up or spraying up method. Preferably, this also can be done and another rolling action completed before the material is set up so as to assure good bonding to the other side of the cushioning layer 13. Again, an adhesive can be employed if desired. In fact, it is preferable to apply a urethane based primer which will act as an adhesive between the respective surfaces.

Figure 5:
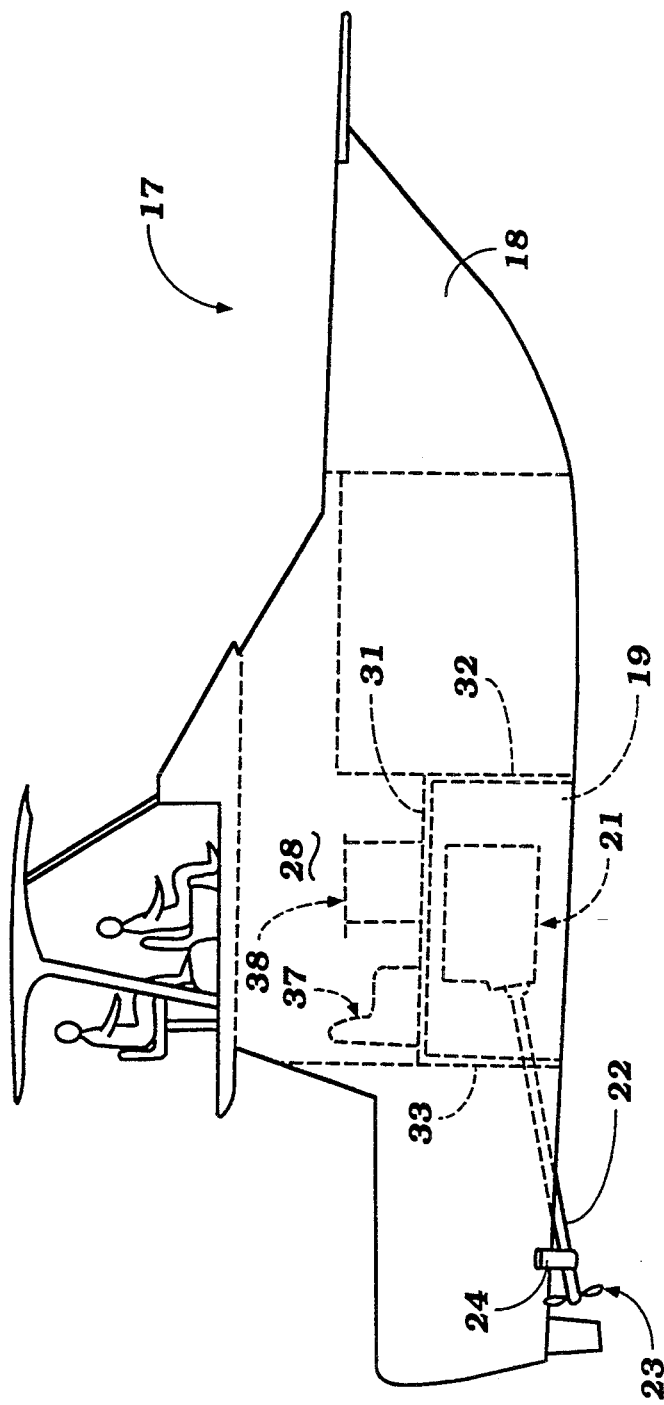
FIG. 5 is a side elevational view of a watercraft constructed in accordance with the utilization of cushioning panels formed in conjunction with the invention.
Figure 6:
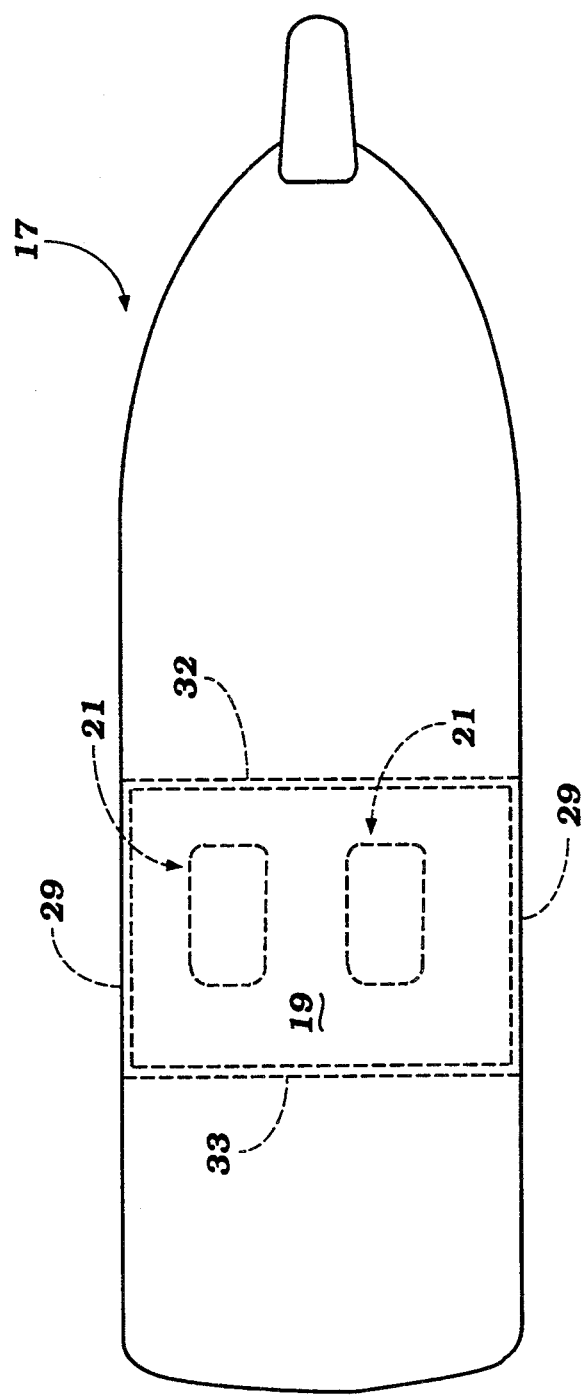
FIG. 6 is a top plan view of the watercraft.
Figure 7:
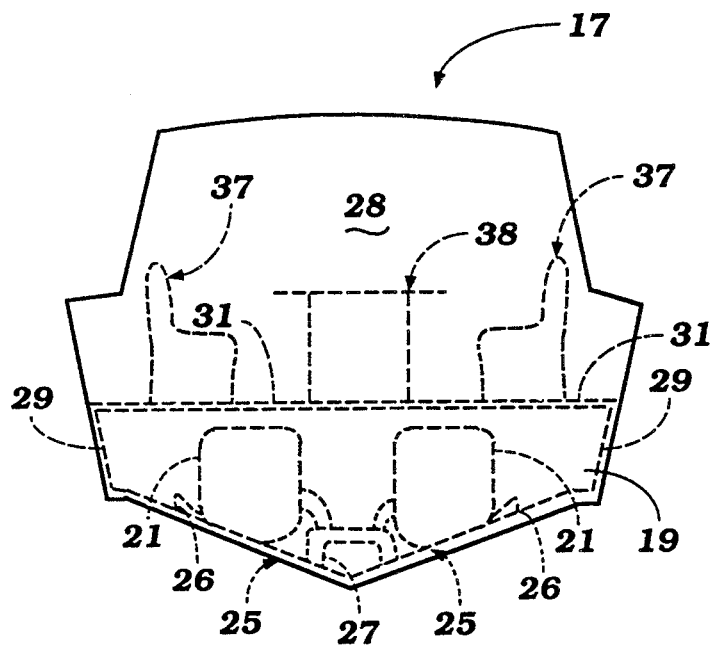
FIG. 7 is a rear elevational view of the watercraft.

As has been noted, damping panels constructed in accordance with the invention are particularly adapted for use in sound and vibration insulation in the watercraft and FIGS. 5–7 show a watercraft and how these panels can be utilized for this purpose. In the illustrated embodiment, the watercraft is identified generally by the reference numeral 17 and is comprised of an outer hull 18. The outer hull 18 may be formed from a suitable material, such as the fiberglass reinforced resin, such as the base plate 12, although certain components may be formed from the damping panels as will be described. The hull 18 forms an engine compartment 19 in which a pair of powering internal combustion engines 21 are positioned. The engines 21 drive a pair of propeller shafts 22 to which screw-type propellers 23 are affixed for propelling the watercraft 17 in a well-known manner. The propeller shafts 22 are journalled in respective bearing blocks 24 formed at the rear underside of the hull 18.

As may be best seen in FIG. 7, the underside of the hull has a V bottom, as indicated at 25 and this portion of the hull may be formed solely from a fiberglass reinforced plastic or from a composite damping plate. Pairs of engine mounts 26 and 27 support the engines 21 on this V bottom 25 in a well-known manner.

The engine compartment 19 underlies a cabin or passenger's compartment 28 and the engines 21 obviously create vibrations which should be dampened from the passenger compartment 28. For this purpose, the engine compartment 19 is defined by side walls 29 that merge into and are connected to the V bottom portions 25, a top wall 31, which also forms a floor for the passenger's compartment 28, and front and rear walls 32 and 33, respectively. All of these walls 29, 31, 32 and 33 are formed from damping panels of the type previously described.

The side plates 29 and the bottom plate 25, if it is also formed as a damping panel, which can be done, are disposed so that their gel coat layers 15 face outwardly against the body of water in which the watercraft is operating. With such a construction, the base plate 12 may, as previously described, have a thickness of approximately 10 mm while the cushioning layer 13 and restraining plate 14 may both have a thickness of approximately 2 mm. By forming the entire V bottom 25 from a damping plate, the vibration of the propellers 23 will also be isolated from the passenger's compartment 28 and the other interior portions of the watercraft. The front and rear wall 32 and 33 are also formed from damping plates as described, but these may also be encased within plywood plates that are properly affixed thereto by adhesive so as to provide the desired interior finish with the watercraft.

Figure 8:
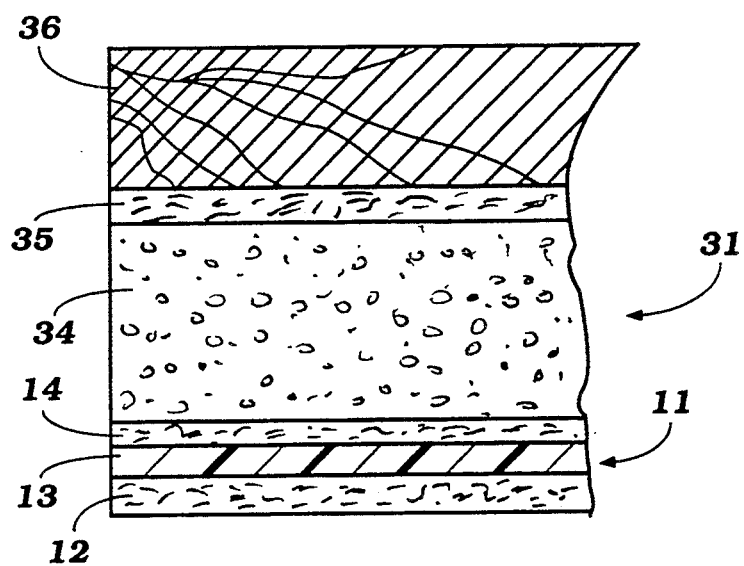
FIG. 8 is an enlarged cross-sectional view, in part similar to FIG. 1, and shows another type of construction including additional facing materials.

FIG. 8 is a cross-sectional view which shows how the bottom plate 31 may be formed considering that it is also the floor of the passenger's compartment 28. As may be seen in FIG. 8, the top wall 31 is comprised of a damping plate 11 as previously described but the gel coat layer 15 is not necessarily required in this construction. However, there is provided a base plate layer 12, a cushioning or damping layer 13 and a retaining layer or plate 14. In this particular embodiment, the base plate layer 12 and the cushioning layer 13 may both have the same thickness of approximately 2 mm while the restraint plate layer 14 has a lesser thickness of about 1.5 mm.

Overlayed on the restraint plate layer 14 and affixed thereto, as by being formed or bonded in place is a thicker layer, indicated generally by the reference numeral 34 which is formed from a foamed plastic so as to afford further sound deadening. This foamed plastic may have a thickness of approximately 20 mm and is overlayed by a further fiberglass reinforced plastic layer 35 which can have a thickness also of approximately 2 mm. Laid on top of the fiberglass reinforced plastic layer 35 is a plywood or wood layer 36 which has a thickness of approximately 10 mm.

This floor layer 31 as thus far described may afford support within the passenger compartment for seats or sofas 37 and a table 38. Of course, other forms of passenger compartments may be employed.

Figure 9:
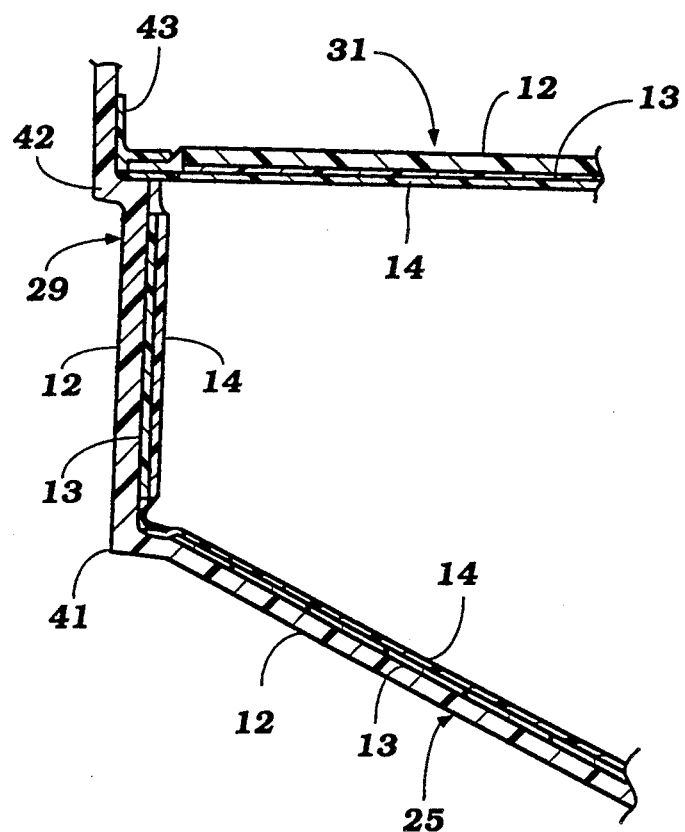
FIG. 9 is an enlarged cross-sectional view showing how a pair of the damping panels may be affixed to each other at joints to form the hull.

FIG. 9 is a cross-sectional view of the left-hand side of the hull as shown in FIG. 7 on an enlarged scale and shows in more detail how the various hull configuration can be made using the damping plates as thus far described. The hull underportion 25 and side walls 29 may be integrally connected to each other and this is done by having their base plates 12 being formed from the same material without a joint therein. The cushioning layers 13 are disposed only on the vertical and undersides and the corner 41 where they are jointed is provided without any cushioning layer 14 so as to make a neater joint and also to afford greater strength. The floor or top layer 31 overlies and is supported on a step 42 formed at the upper end of the side wall 29 and a gap is formed at the corner of this joint which is filled with a suitable sealant 43. As a result of this construction, the hull inner surface will have a smooth configuration and be wrinkle-free and yet the overall construction will provide effective sound and vibration damping. Also, because of the method of fabrication which has been described, the structure will have high strength and there will not be any separation between the various layers.

It should be readily apparent that the foregoing description is that of the preferred embodiments of the invention and that various changes and modifications may be made without departing from the spirit and scope of the invention, as defined by the appended claims.

I claim:

1. A damping pad comprised of a base plate made up of a fiberglass reinforced plastic, a layer of cushioning material affixed to one side of said base plate, and a restraint plate formed of a fiberglass reinforced plastic affixed to the other side of said layer of cushioning material, said restraint plate being of a lesser thickness than said base plate.

2. The damping pad of claim 1, wherein the thickness of the restraint plate is not greater than the thickness of the cushioning material.

3. The damping pad of claim 1, wherein the base plate, layer of cushioning material and restraint plate are each bonded to the other.

4. The damping pad of claim 3, wherein the thickness of the restraint plate is not greater than the thickness of the cushioning material.

5. The damping pad of claim 3, wherein at least one of the base plate and retaining plate are bonded to the cushioning material by assembling the cushioning material to the one plate before the curing of the one plate has been completed.

6. The damping pad of claim 5, wherein both plates are affixed to the layer of cushioning material by assembling them before curing has completed.

7. The damping pad of claim 6, further including a bonding material at the interface between the plates and the cushioning material.

8. The damping pad of claim 3, wherein the cushioning material is formed with a plurality of spaced apart holes.

9. The damping pad of claim 8, wherein the thickness of the restraint plate is not greater than the thickness of the cushioning material.

10. The damping pad of claim 8, wherein the thickness of the restraint plate is not greater than the thickness of the cushioning material.

11. The damping pad of claim 10, wherein both plates are affixed to the layer of cushioning material by assembling them before curing has completed.

12. The damping pad of claim 11, further including a bonding material at the interface between the plates and the cushioning material.

13. The damping pad of claim 1, wherein the layer of cushioning material is formed from a copolymer of vinyl chloride and vinyl acetate.

14. A cushioning pad comprised of a base plate made up of a fiberglass reinforced plastic, a layer of cushioning material affixed to one side of said base plate, and a restraint plate formed of a fiberglass reinforced plastic affixed to the other side of said layer of cushioning material, and a plurality of holes formed in the cushioning material at least on the faces thereof engaged with the fiberglass reinforced plastic.

15. The cushioning pad of 14, wherein the base plate, layer of cushioning material and restraint plate are each bonded to the other.

16. The cushioning pad of 15, wherein at least one of the base plate and retaining plate are bonded to the cushioning material by assembling the cushioning material to the one plate before the curing of the one plate has been completed.

17. The cushioning pad of 16, wherein both plates are affixed to the layer of cushioning material by assembling them before curing has completed.

18. The cushioning pad of 17, further including the addition of a bonding material at the interface between the plates and the cushioning material during assembly.

* * * * *